(12) United States Patent
Marchek et al.

(10) Patent No.: US 11,462,897 B2
(45) Date of Patent: Oct. 4, 2022

(54) CABLE MOUNTING CLAMPS (71) Applicant: AFL Telecommunications LLC, Duncan, SC (US)

(72) Inventors: Kyle Marchek, Greer, SC (US); Wilfred Courchaine, Moore, SC (US); Mark Vogel, Greenville, SC (US); Shirley Ball, Greer, SC (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 0 days.

(21) Appl. No.: 17/077,500

(22) Filed: Oct. 22, 2020

(65) Prior Publication Data
US 2022/0131358 A1    Apr. 28, 2022

(51) Int. Cl.
H02G 3/04    (2006.01)
F16L 3/10    (2006.01)
F16B 15/00   (2006.01)
F16B 19/00   (2006.01)
G02B 6/44    (2006.01)
H02G 3/32    (2006.01)
F16L 3/04    (2006.01)
H02G 3/34    (2006.01)
H02G 15/18   (2006.01)

(52) U.S. Cl.
CPC ............... H02G 3/32 (2013.01); F16L 3/04 (2013.01); F16B 15/00 (2013.01); F16B 19/00 (2013.01); G02B 6/44 (2013.01); H02G 3/34 (2013.01); H02G 15/18 (2013.01)

(58) Field of Classification Search
CPC .. H02G 3/32; H02G 3/02; H02G 3/04; H02G 3/24; F16L 3/04; G02B 6/4471; G02B 6/4446; G02B 6/4452
See application file for complete search history.

(56) References Cited

U.S. PATENT DOCUMENTS 5,696,351 A * 12/1997 Benn .................. G02B 6/4477
                                                174/138 F
5,835,660 A    11/1998 Jung
(Continued)

FOREIGN PATENT DOCUMENTS

EP    2060369 A1    5/2009
EP    3573203 A1    11/2019
(Continued)

OTHER PUBLICATIONS

International Search Report Corresponding with Application No. PCT/US2021/056204 dated Feb. 1, 2022 (5 pages).

Primary Examiner — Tan Le
(74) Attorney, Agent, or Firm — Dority & Manning, P.A.

(57) ABSTRACT

A cable assembly includes a cable and a cable mounting clamp. The cable mounting clamp includes a base removably connectable to a surface. The base includes an outer body which defines an inner channel and a support ramp disposed within the inner channel, the inner channel extending along a longitudinal axis. The cable mounting clamp further includes a roller tube disposed within the inner channel and moveably mounted on the support ramp, the roller tube translatable along the longitudinal axis relative to the support ramp. The cable is inserted through the roller tube and extends through the inner channel, such that the cable is translatable with the roller tube along the longitudinal axis.

19 Claims, 8 Drawing Sheets (56) References Cited

U.S. PATENT DOCUMENTS

| | | | |
|---|---|---|---|
| 5,873,550 A | 2/1999 | Phillips | |
| 6,099,519 A * | 8/2000 | Olsen | A61M 16/0463 604/171 |
| 6,595,473 B2 | 7/2003 | Aoki | |
| 6,668,865 B2 | 12/2003 | Miyamoto | |
| 6,684,021 B2 | 1/2004 | Wu | |
| 6,717,055 B2 * | 4/2004 | Kato | B60R 16/0215 173/136 |
| 6,732,764 B2 | 5/2004 | Miyamoto | |
| 6,853,796 B2 | 2/2005 | Vastmans | |
| 6,892,990 B2 | 5/2005 | Pisczak | |
| 6,968,864 B2 * | 11/2005 | Miyamoto | B60R 16/0215 138/108 |
| 7,109,421 B2 | 9/2006 | Sekino | |
| 7,330,629 B2 | 2/2008 | Cooke | |
| 7,556,225 B2 | 7/2009 | Riedy | |
| 7,558,459 B2 | 7/2009 | Carpenter | |
| 7,613,376 B2 | 11/2009 | Wright | |
| 7,692,095 B2 | 4/2010 | Katsumata | |
| 7,711,235 B2 | 5/2010 | Riggsby | |
| 7,939,759 B2 | 5/2011 | Henry | |
| 7,945,136 B2 | 5/2011 | Cooke | |
| 8,020,812 B2 * | 9/2011 | Matsuno | F16L 3/1075 248/71 |
| 8,135,257 B2 | 3/2012 | Cooke | |
| 8,218,936 B2 | 7/2012 | Sek | |
| 8,366,059 B2 * | 2/2013 | Fannon | H02G 11/00 248/74.3 |
| 8,737,797 B2 | 5/2014 | Kubinski | |
| 8,953,924 B2 | 2/2015 | Cote | |
| 9,059,578 B2 | 6/2015 | Sokolowski | |
| 9,256,042 B2 | 2/2016 | Vastmans | |
| 9,441,763 B2 | 9/2016 | Denner | |
| 9,539,959 B2 | 1/2017 | Matsumura | |
| 9,556,972 B2 | 1/2017 | White | |
| 9,692,215 B2 * | 6/2017 | Yamamoto | H02G 3/04 |
| 9,862,337 B2 | 1/2018 | Inao | |
| 9,939,601 B2 | 4/2018 | Sievers | |
| 10,012,330 B1 | 7/2018 | Thomas | |
| 10,295,084 B2 | 5/2019 | Izawa | |
| 10,589,691 B2 | 3/2020 | Rouleau | |
| 10,761,285 B2 * | 9/2020 | Courchaine | H02G 3/34 |
| 2002/0000499 A1 | 1/2002 | Aoki | |
| 2006/0272848 A1 | 12/2006 | Guthke | |
| 2007/0025061 A1 | 2/2007 | Kogure | |
| 2014/0151514 A1 | 6/2014 | Asai | |
| 2019/0071035 A1 | 3/2019 | Sekino | |
| 2019/0204522 A1 | 7/2019 | Courchaine | |
| 2020/0194987 A1 | 6/2020 | Gu | |

FOREIGN PATENT DOCUMENTS

| | | |
|---|---|---|
| EP | 3637570 A1 | 4/2020 |
| JP | 2009296697 A * | 12/2009 |
| WO | WO2019079460 A1 | 4/2019 |
| WO | WO2019081763 A1 | 5/2019 |
| WO | WO2019101950 A1 | 5/2019 |
| WO | WO2019110979 A1 | 6/2019 |
| WO | WO2020043914 A1 | 3/2020 |

* cited by examiner

CABLE MOUNTING CLAMPS

FIELD

The present disclosure relates generally to cable mounting clamps, such as for mounting cables to enclosure.

BACKGROUND

Secure mounting of cables during installation thereof is a necessity in a variety of environments. One such environment is in fiber optics, and in particular in the fiber optic inside office environment. In such environment, fiber optic distribution enclosures are utilized to manage optical fiber distribution. An enclosure typically accommodates one or more fiber trays, each of which includes one or more cassettes. Within a cassette, an incoming optical fiber may be spliced, split, etc., and outgoing optical fibers may be connected to the cassette and incoming optical fibers to provide fiber optic connections within the inside office environment. The incoming cables which include incoming optical fibers must be secured to the enclosures to facilitate secure, reliable connections.

Current techniques for mounting cables require the use of tie-wraps, hook-and-loop fasteners, hose clamps, bracket clamps, etc. In many cases, the mounting performance using such apparatus is less than desirable, and/or the ability to remove and reattach such apparatus to relocate or adjust the associated cable is limited. Additionally, while some "quick-release" type solutions are available, these solutions require an additional mounting plate to be secured within the enclosure. Further, presently known mounting solutions do not relieve torsional or bending stresses in the associated cables. This is of particular concern when multiple mounting points are necessary. For example, in some cases, large cables may need to be broken out into smaller furcated subassemblies. The larger cable as well as the subassemblies may all need to be mounted and secured, thus requiring multiple mounting assemblies at multiple locations. It may thus be difficult to securely provide a mount at all necessary locations without incurring torsional or bending stress issues.

Accordingly, improved cable mounting clamps are desired. For example, cable mounting clamps which are easily and efficiently removable and re-attachable in associated environments, such as to associated enclosures, would be advantageous. Further, cable mounting clamps which include features for relieving torsional or bending stresses in associated cables would be advantageous.

BRIEF DESCRIPTION

Aspects and advantages of the invention will be set forth in part in the following description, or may be obvious from the description, or may be learned through practice of the invention.

In accordance with one embodiment, a cable mounting clamp is provided. The cable mounting clamp may be provided for mounting a cable to a surface. The cable mounting clamp includes a base removably connectable to the surface. The base includes an outer body which defines an inner channel and a support ramp disposed within the inner channel, the inner channel extending along a longitudinal axis. The cable mounting clamp further includes a roller tube disposed within the inner channel and moveably mounted on the support ramp, the roller tube translatable along the longitudinal axis relative to the support ramp.

In accordance with another embodiment, a cable assembly is provided. The cable assembly may be mountable to a surface. The cable assembly includes a cable and a cable mounting clamp. The cable mounting clamp includes a base removably connectable to the surface. The base includes an outer body which defines an inner channel and a support ramp disposed within the inner channel, the inner channel extending along a longitudinal axis. The cable mounting clamp further includes a roller tube disposed within the inner channel and moveably mounted on the support ramp, the roller tube translatable along the longitudinal axis relative to the support ramp. The cable is inserted through the roller tube and extends through the inner channel, such that the cable is translatable with the roller tube along the longitudinal axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
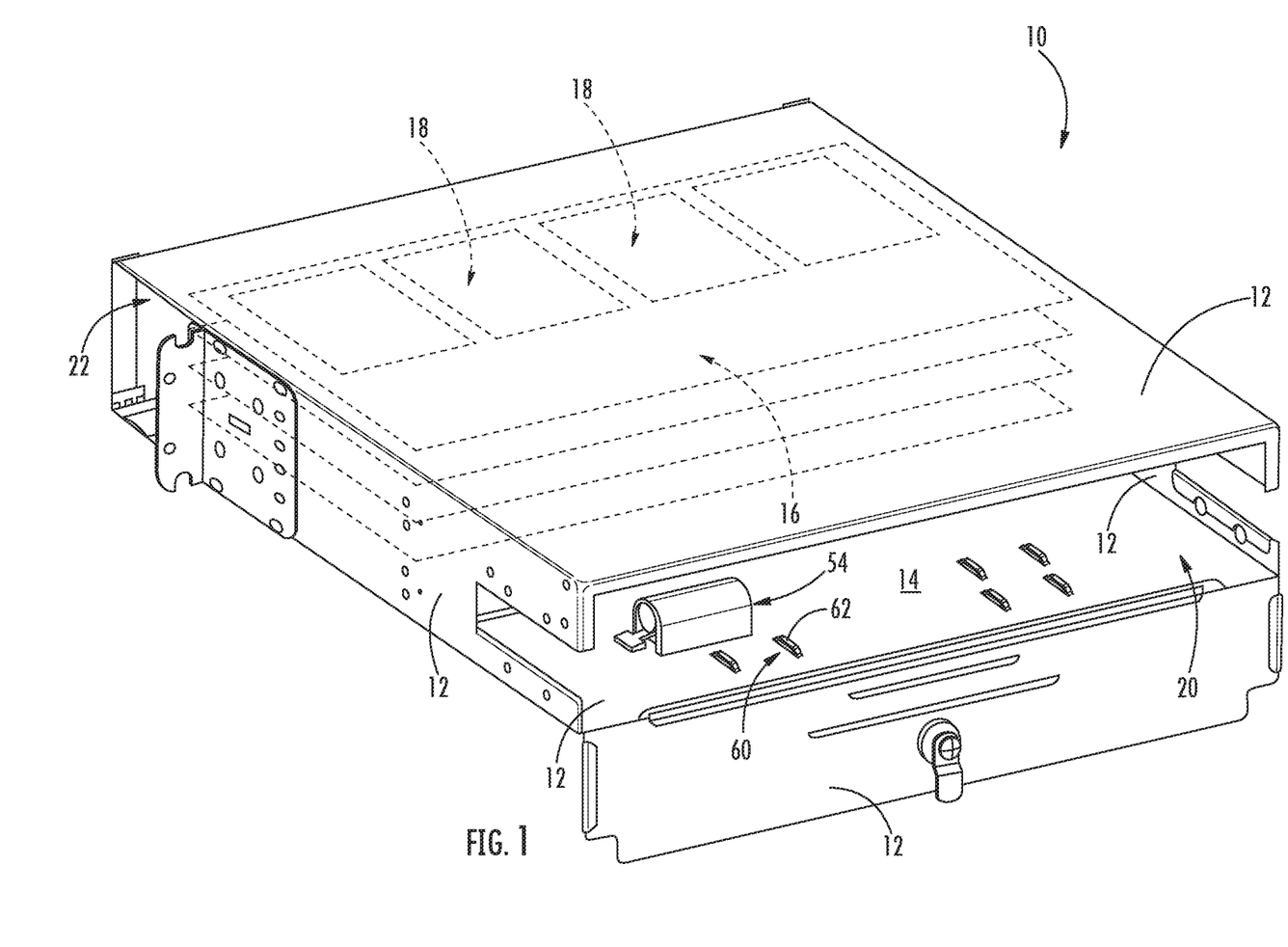
FIG. 1 is a rear perspective view of a fiber optic distribution enclosure in accordance with embodiments of the present disclosure.
Figure 2:
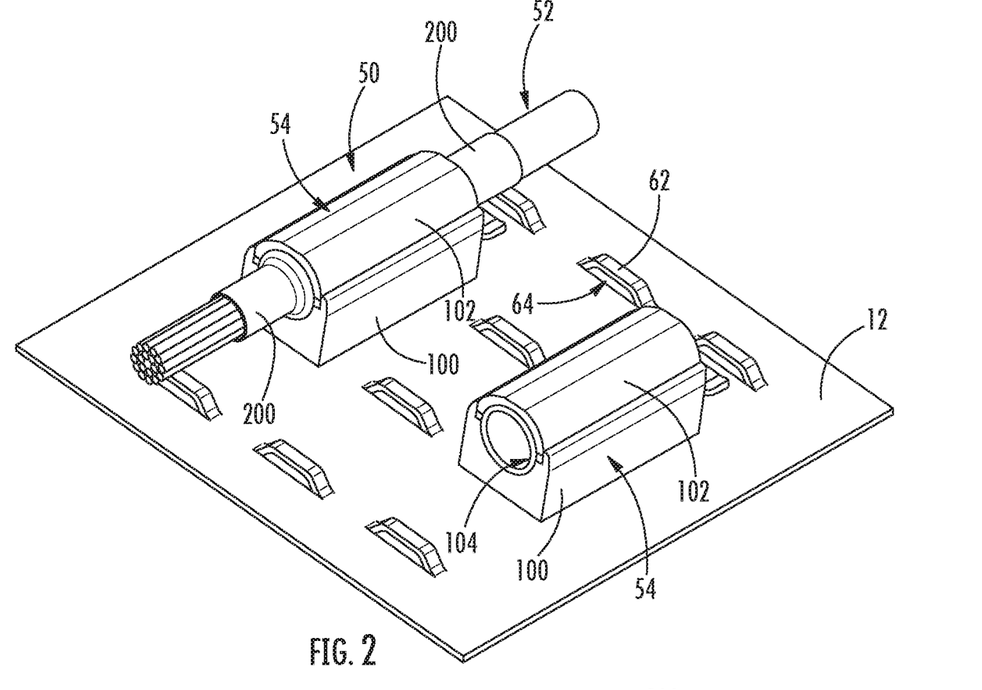
FIG. 2 is a top perspective view of a cable assembly and cable mounting clamp mounted to a wall of a fiber optic distribution enclosure in accordance with embodiments of the present disclosure.
Figure 3:
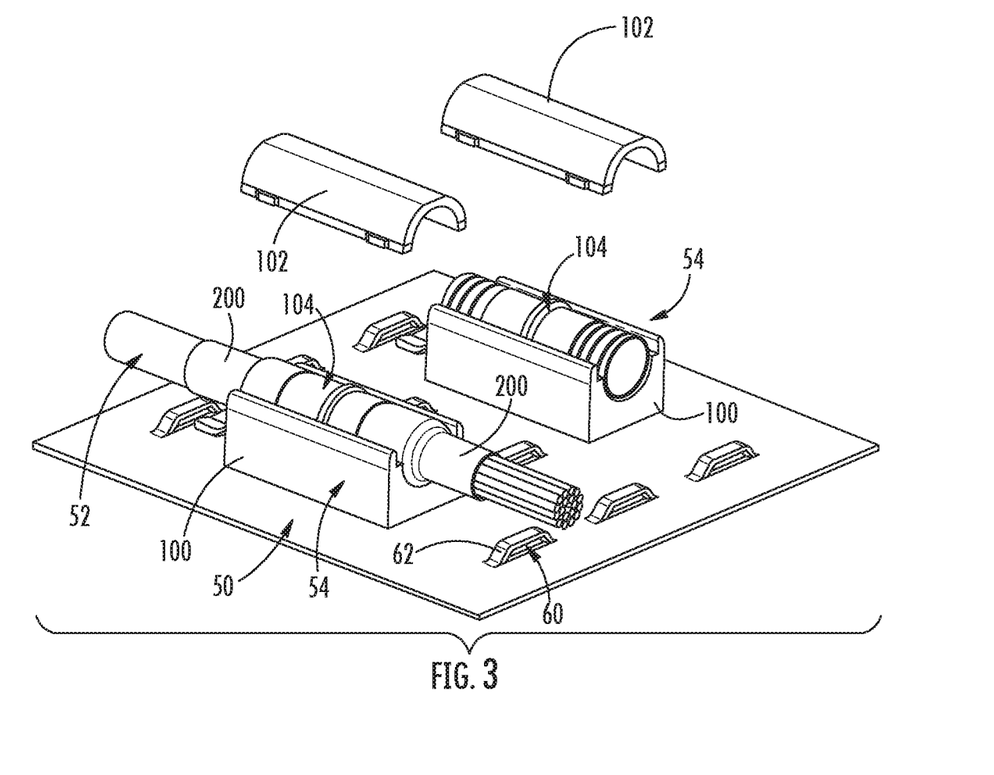
FIG. 3 is a top perspective view of a cable assembly and cable mounting clamp mounted to a wall of a fiber optic distribution enclosure, with caps exploded therefrom, in accordance with embodiments of the present disclosure.
Figure 4:
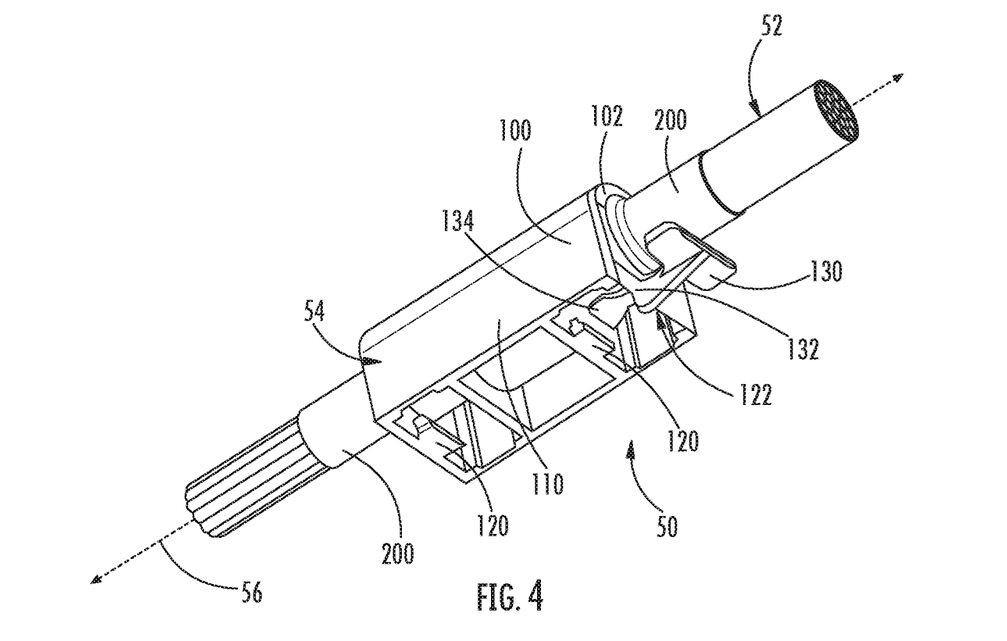
FIG. 4 is a bottom perspective view of a cable assembly in accordance with embodiments of the present disclosure.

Referring now to FIG. 1, one embodiment of a fiber optic distribution enclosure 10 is provided. Fiber optic distribution enclosures 10 are generally utilized to manage optical fiber distribution, typically in inside office environments. Enclosure 10 includes one or more walls 12, as shown, which define an interior 14 of the enclosure. Within the enclosure, one or more trays 16 may be housed. Each tray 16 may include one or more cassettes 18.

In general, an incoming fiber optic cable which includes a plurality of optical fibers may enter the interior 14 of the enclosure 10 via a rear opening 20 defined by the walls 12. Optical fibers of the incoming fiber optic cable may extend from the cable within the interior 14. These optical fibers may be routed into one or more of the cassettes 18, and spliced, split, etc. within the cassettes 18. Outgoing optical fibers may also be routed to the cassettes 18, and connected to the incoming optical fibers via splicing, splitting, etc. These outgoing optical fibers may be routed from the cassettes 18, and may exit the interior 14 of the enclosure 10 via a front opening 22 of the enclosure 10.

The incoming fiber optic cable must be secured to the enclosure 10 to facilitate secure, reliable connections of the incoming optical fibers, and to prevent risk of breaking or damaging such incoming optical fibers. Accordingly, the present disclosure is directed to cable assemblies 50 which are mountable to surfaces, such to the walls 12 of enclosures 10 as discussed herein.

More specifically, a cable assembly 50 in accordance with the present disclosure includes a cable 52 and one or more cable mounting clamps 54. The cable mounting clamp(s) 54 securely and removably mount the cable 52 to an associated surface, such as in exemplary embodiments a wall 12 of an enclosure 10. Such secure, removable mounting is a direct mounting, with direct contact between the clamp 54 and surface (such as the wall 12), thus eliminating the need for additional mounting plates, etc. to be installed (such as in the enclosure 10). Cable mounting clamps 54 in accordance with the present disclosure advantageously facilitate efficient mounting and removal of cables 52, and further advantageously facilitate relief of torsional or bending stresses in the cables 52. Cable mounting clamps 54 in accordance with the present disclosure are particularly advantageous when multiple mounting locations are required for a cable 52 (and/or smaller furcated subassemblies thereof). The use of such cable mounting clamps 54 can significantly reduce cable torsional or bending stress issues, and can also advantageously improve ease of assembly by providing increased tolerances for the cable mounting clamp 54 locations relative to each other.

Referring now to FIGS. 2 through 15, various embodiments of cable assemblies 50 and cable mounting clamps 54 in accordance with the present disclosure are provided. In general, a cable mounting clamp 54 in accordance with the present disclosure may include a base 100 and a roller tube 104. In some embodiments, as illustrated in FIGS. 1-5, 8-9, and 11, a cable mounting clamp 54 may further include a cap 102. In other embodiments, as illustrated in FIGS. 12 through 15, no cap is necessary. Base 100 may generally be removably connectable to a surface (such as a wall 12) to securely and removable mount the clamp 54 to the surface. Roller tube 104 may generally be mounted to the base 100, such as positioned between the base 100 and cap 102 and/or removably secured to the base 100. Roller tube 104 may advantageously be translatable along an axis of the clamp 54 relative to the base 100, and may facilitate translation of a cable 52 disposed therein. Further, in some embodiments, roller tube 104 may be rotatable about the axis of the clamp 54, and may facilitate rotation of a cable 52 disposed therein. Cable 52 may extend through the roller tube 104 and between the base 100 and cap 102, and may advantageously be translatable (and, optionally, rotatable) relative to the base 100 with the roller tube 104.

Base 100 generally includes an outer body 110 which defines an inner channel 112. The inner channel 112 extends along an axis 56 of the clamp 54. In exemplary embodiments, the axis 56 is a longitudinal axis 56 of the clamp 54. A support ramp 114, which may be or include an inner surface of the base 110, may be disposed within and may partially define the inner channel 112. Support ramp 114 may have an arcuate shape about the axis 56, and thus for example be an arcuate surface as shown.

Figure 5:
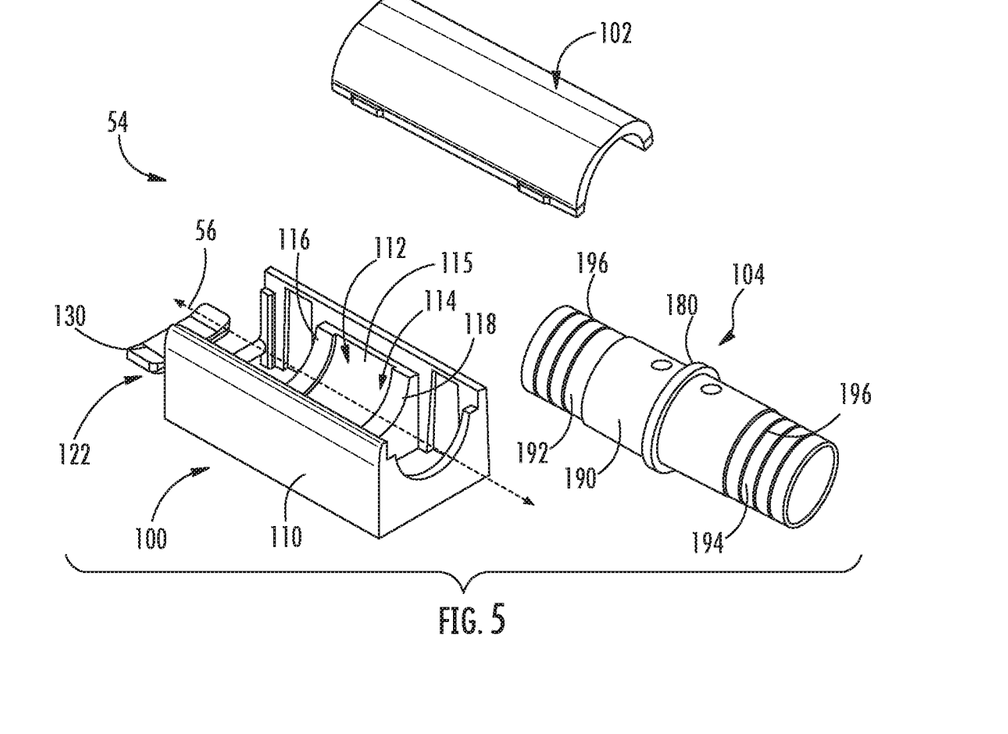
FIG. 5 is an exploded perspective view of components of a cable mounting clamp in accordance with embodiments of the present disclosure.
Figure 6:
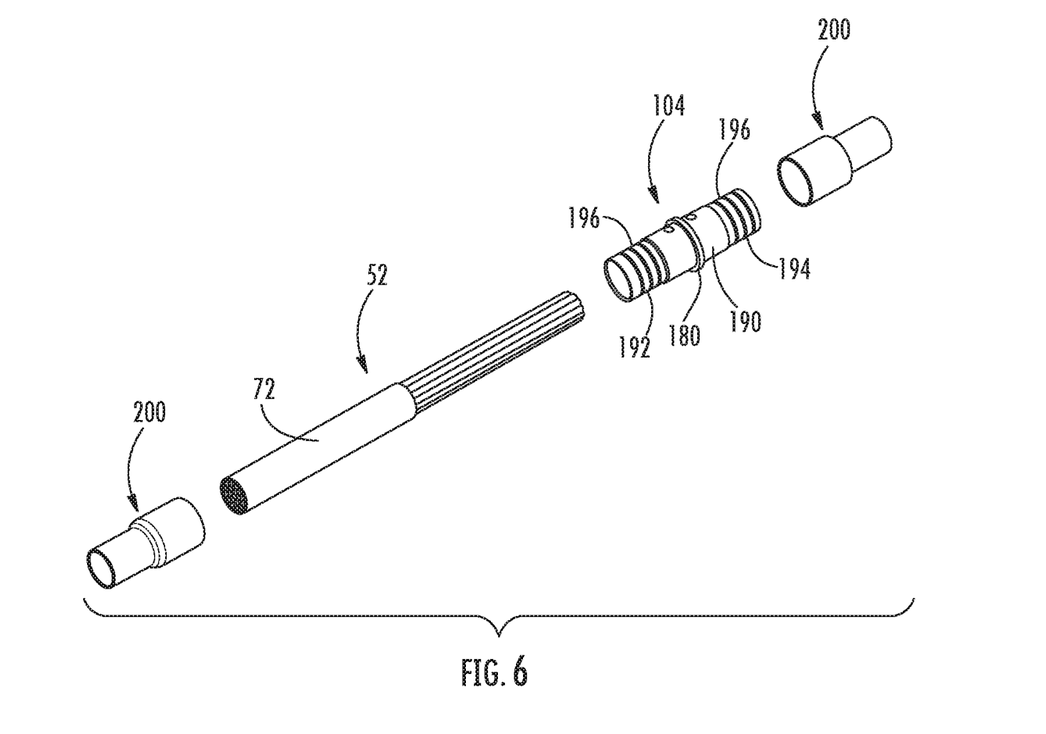
FIG. 6 is an exploded perspective view of components of a cable assembly in accordance with embodiments of the present disclosure.
Figure 7:
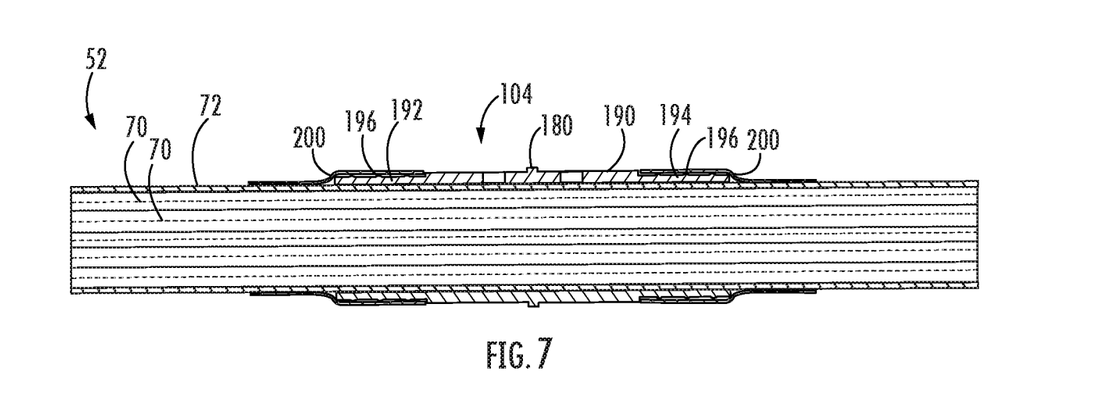
FIG. 7 is an assembled cross-sectional view of the components of FIG. 6.
Figure 8:
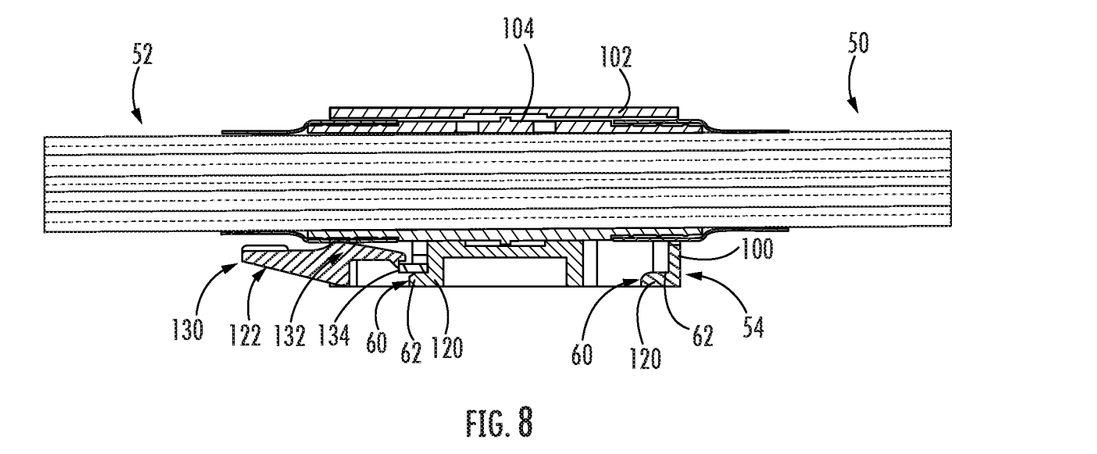
FIG. 8 is a cross-sectional view of a cable assembly, with a cable mounting clamp thereof in a locked position, in accordance with embodiments of the present disclosure.
Figure 9:
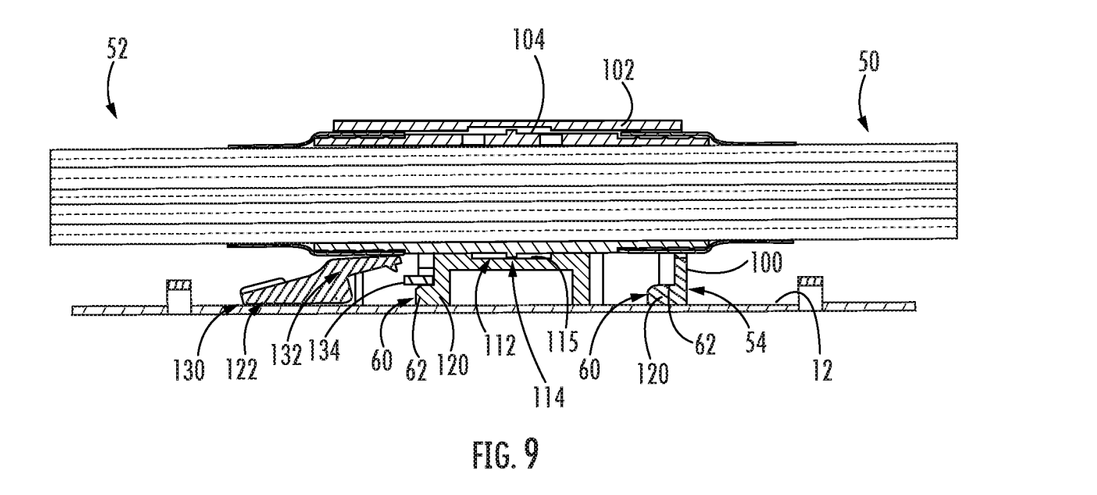
FIG. 9 is a cross-sectional view of a cable assembly, with a cable mounting clamp thereof in an unlocked position, in accordance with embodiments of the present disclosure.
Figure 12:
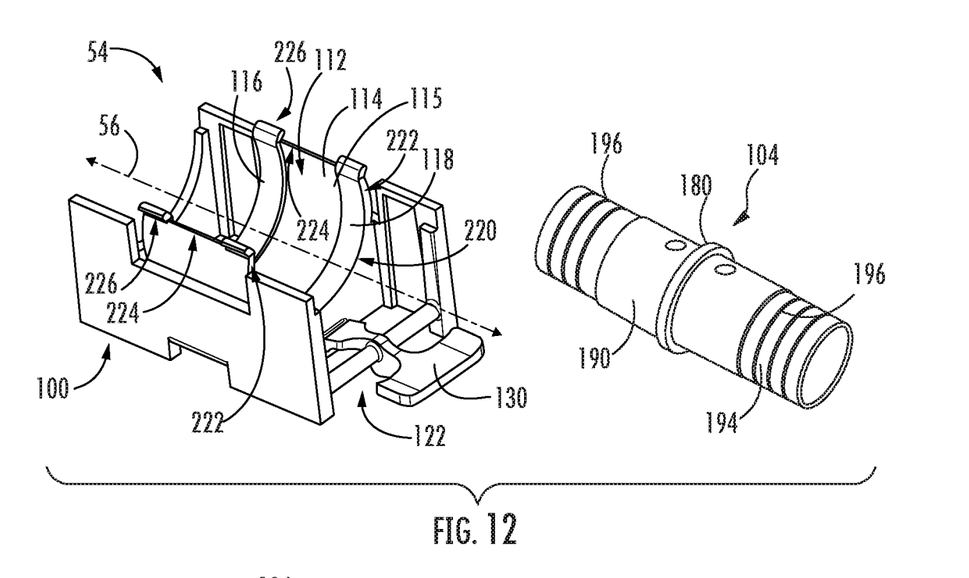
FIG. 12 is an exploded perspective view of components of a cable mounting clamp in accordance with still other embodiments of the present disclosure.
Figure 13:
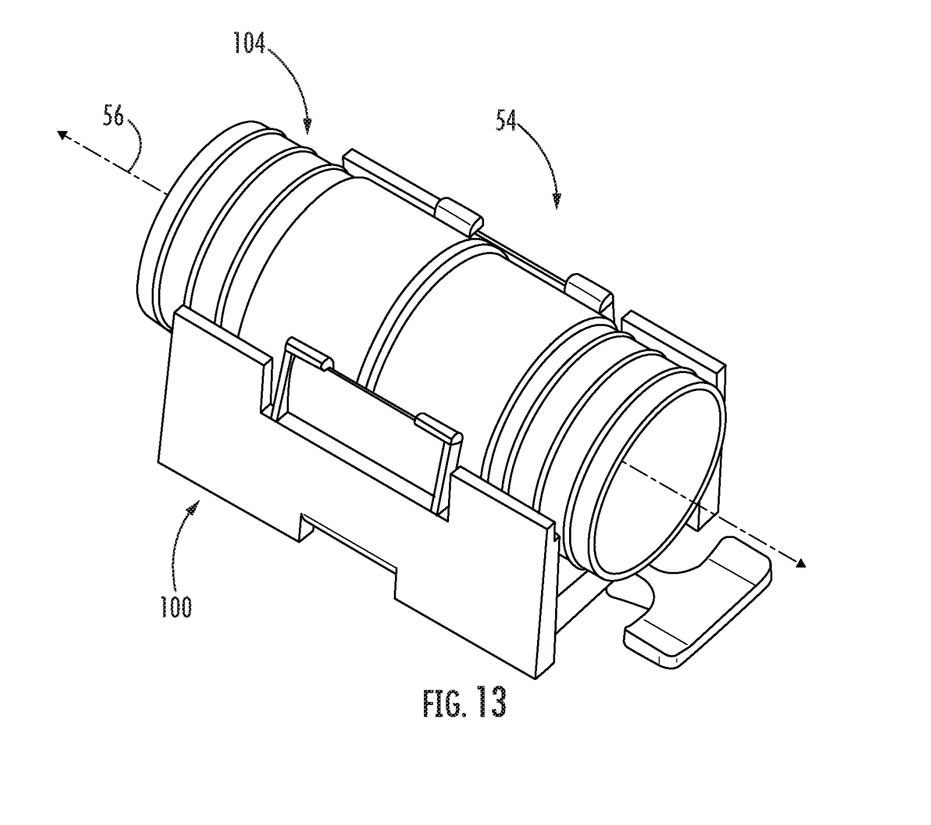
FIG. 13 is an assembled perspective view of a cable mounting clamp in accordance with still other embodiments of the present disclosure.
Figure 14:
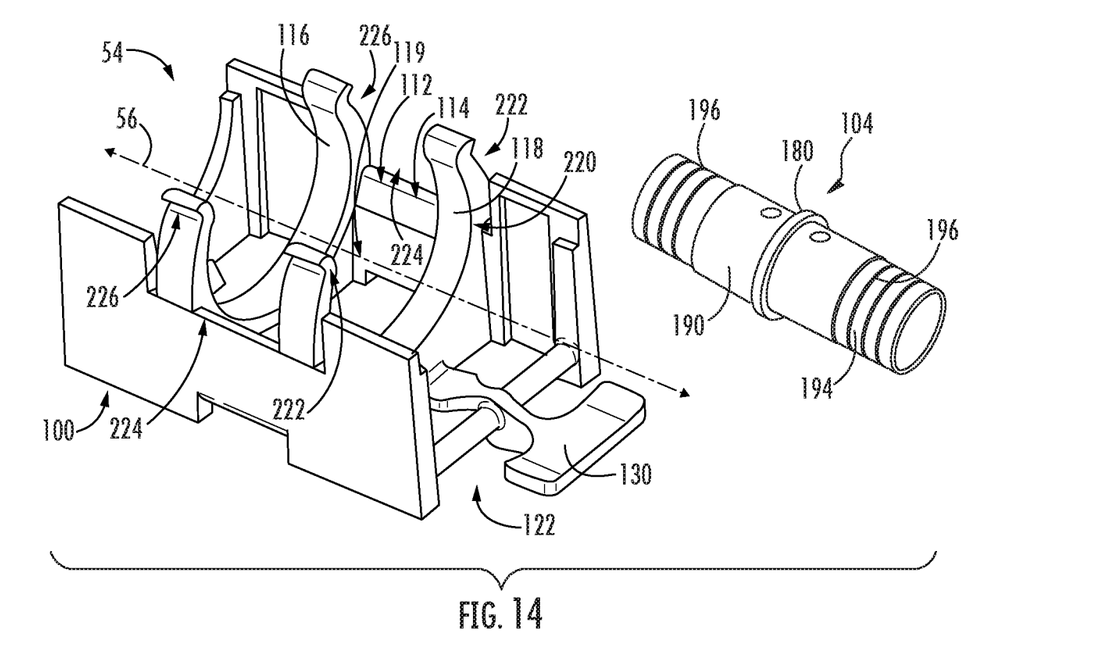
FIG. 14 is an exploded perspective view of components of a cable mounting clamp in accordance with further embodiments of the present disclosure.
Figure 15:
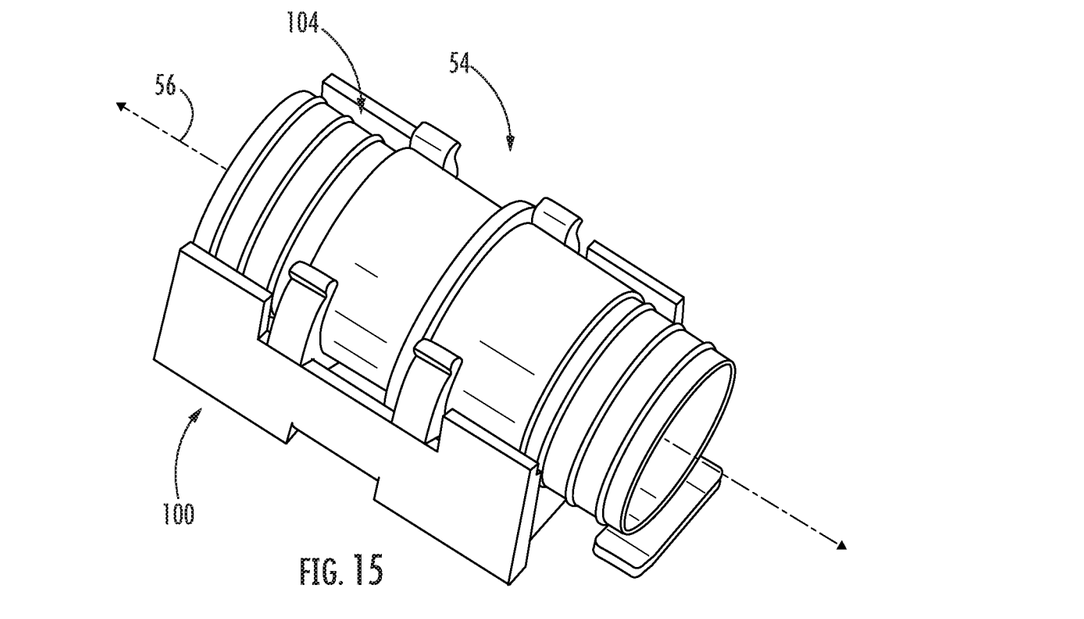
FIG. 15 is an assembled perspective view of a cable mounting clamp in accordance with further embodiments of the present disclosure.

Support ramp 114 may, in some embodiments, include a central inner surface 115, as illustrated in FIGS. 5, 12, and 13. Further, in exemplary embodiments, support ramp 114 may include first and second rails 116, 118, respectively. The rails 116, 118 may extend from the ramp 114 into the inner channel 112 and be spaced apart from each other along the axis 56 act as borders of the support ramp 114. For example, in some embodiments as illustrated in FIGS. 5, 12, and 13, the rails 116, 118 may extend from the central inner surface 115 and may thus each form a step at the intersection with the central inner surface 115. Alternatively, in some embodiments as illustrated in FIGS. 14 and 15, no central inner surface 115 need be provided, and a gap 119 may instead be defined between the rails 116, 118.

Base 100 may further include one or more tabs 120 and one or more locks 122. The tabs 120 generally locate the base 100 in position on a surface (such as a wall 12) for secure connection thereto, and the locks 122 releasably connect the base 100 (and thus the clamp 54) to the surface (such as the wall 12). For example, each tab 120 may be removable insertable into an aperture 60, which may for example be defined in a lance or a catch, as discussed herein, of the surface. Each lock 122 may be releasably connectable to the surface (such as the wall 12).

Referring for example to FIGS. 4, 5 8, 9, and 11, in some embodiments the base 100 includes a plurality (such as two as shown) of tabs 120 and a lock 122 that is separate from the tabs 120. In these embodiments, tabs 120 are positioned within an interior of the base 100, and are aligned along the axis 56. Lock 122 is a lever which includes a handle 130, a pivot point 132, and a contact face 134. Pivot point 132 is disposed between the handle 130 and the contact face 134, such that the contact face 134 is opposite the handle 130 relative to the pivot point 132.

To mount the base 100 (and thus the clamp 54) to a surface (such as a wall 12), the tabs 120 may be inserted through apertures 60, which as illustrated may be defined in lances 62 which are formed from the surface. The contact face 134 may contact one of the lances 62, thus removably locking the base 100 (and thus the clamp 54) in place, mounted to the surface. Such locked position is illustrated, for example, in FIGS. 8 and 11. To remove the base 100, the handle 130 may be pressed on by a user, and this force may cause rotation of the contact face 134 about the pivot point 132 such that the contact face 134 no longer contacts the lance 62. Such unlocked position is illustrated, for example, in FIG. 9. This lack of contact then allows the user to slide the tabs 120 from within the apertures 60, thus removing the base 100 from being mounted to the surface.

It should be understood that the present disclosure is not limited to the above-described base 100 components for removable connecting the base 100 (and thus the clamp 54) to a surface (such as a wall 12). Rather, any suitable components which can provide such removable connection are within the scope and spirit of the present disclosure. Additional exemplary embodiments are provided in, for example, U.S. patent application Ser. No. 15/862,225, the disclosure of which is incorporated by reference herein in its entirety.

Referring again now to FIGS. 2 through 15, and as discussed above, a clamp 54 further includes a roller tube 104 and, in some embodiments, a cap 102. As illustrated in FIGS. 1-5, 8-9, and 11, the cap 102 may be generally connectable to (and, when assembled, connected to) the base 100 to further define the inner channel 112 therebetween. In exemplary embodiments, cap 102 may have an inner surface which has an arcuate shape about the axis 56, and thus may for example be an arcuately shaped cap 102 as shown.

In other embodiments, as illustrated in FIGS. 12 through 15, no cap may be utilized. For example, support ramp 114 may include a central ramp portion 220, which may include portions of the central inner surface 115 or gap 119 and/or the rails 116, 118, as shown. The central ramp portion 220 may be included in embodiments when the cap 102 is utilized or not utilized. However, in embodiments when a cap is not utilized, support ramp 114 may further include opposing cantilevered wings 222, each extending from the central ramp portion 220. Each wing 222 may include cantilevered portions of the central inner surface 115 or gap 119 and/or rails 116, 118, as shown. The wings 222 may extend generally above the central ramp portion 220 and may continue the arcuate shape of the support ramp 114, and may further define the inner channel 112.

In exemplary embodiments, wings 222 may be resiliently biasable to selectively secure the roller tube 104 within the support ramp 114. For example, to mount the roller tube 104 on the support ramp 114, the roller tube 104 may be moved in a transverse direction passed and through cantilevered ends 224 of the wings 222 into the inner channel 112. As the roller tube 104 is moved in such direction, it may contact the wings 222 (such as the ends 224 thereof) and cause the wings 222 to bias outwardly, allowing the roller tube 104 to pass. By being resiliently biasable, the wings 222 may spring back into their general original positions after the roller tube 104 has passed, such that the roller tube 104 is secured therein. The roller tube 104 may further be removed in a similar manner.

In some embodiments, clips 226 may be provided in the ends 224 of the wings 222, such as at the ends of the rails 116, 118. Clips 226 may provide further security for the roller tube 104 when disposed within the support ramp 114.

As shown in FIGS. 2-5, 8-9, and 11-15, roller tube 104 may be positionable within (and, when assembled, disposed within) the inner channel 112. Further, the roller tube 104 may be moveable mounted on the support ramp 114, such as in exemplary embodiments translatable along the axis 56 relative to the support ramp 114. For example, roller tube 104 may be positioned in the inner channel 112 such that the roller tube 104 extends along the axis 56. Further, the roller tube 104 may be in contact with the support ramp 114. Translation along the axis 56 may be relative to both the base 100 and the cap 102 (if utilized).

For example, as discussed, support ramp 114 may include first and second rails 116, 118, respectively. In some embodiments, as shown in FIGS. 3, 5-9, and 12-15, roller tube 104 may include a single outer flange 180, which may be an annular flange as shown. The single outer flange 180 may, for example, be positioned generally at a longitudinal center point (e.g. along axis 56). When only a single outer flange 180 is utilize, the roller tube 104 may be translatable such that the single outer flange 180 can float between and selectively contact one of the first rail 116 or second rail 118. For example, the roller tube 104 can slide along the axis 56 in one direction until the flange 180 contacts the first rail 116, and can slide along the axis 56 in the opposite direction until the flange 180 contacts the second rail 118. Such arrangement of the outer flange 180 floating between the rails 116, 118 also advantageously reduces or prevents the risk of the roller tube 104 becoming unsecured from the base 100.

Figure 10:
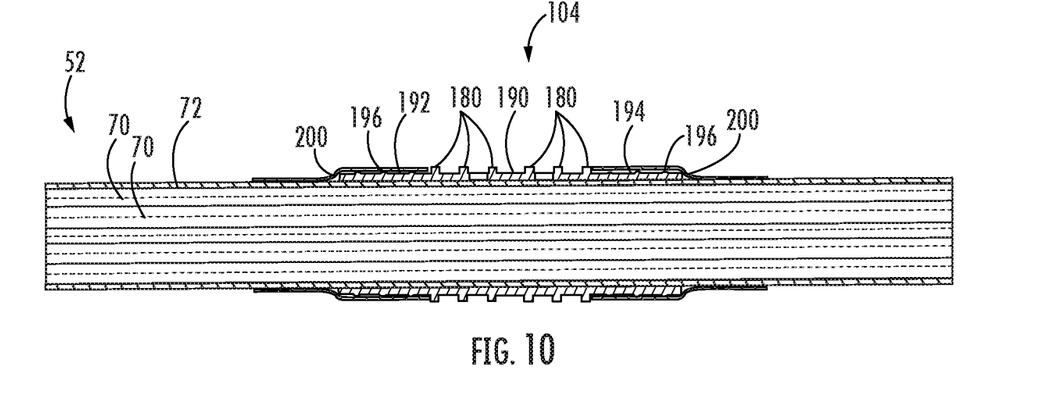
FIG. 10 is an assembled cross-sectional view of components of a cable assembly in accordance with other embodiments of the present disclosure.
Figure 11:
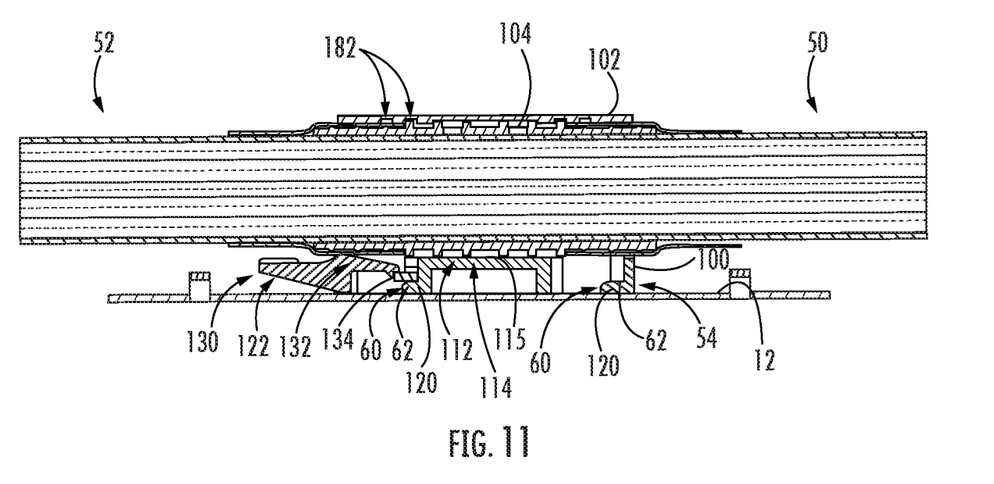
FIG. 11 is a cross-sectional view of a cable assembly, with a cable mounting clamp thereof in a locked position, in accordance with other embodiments of the present disclosure.

In other embodiments, as illustrated in FIGS. 10 and 11, roller tube 104 may include a plurality of outer flanges 180, each of which may be an annular flange as shown. The outer flanges 180 may, for example, be spaced apart from each other along the axis 56. Further, in some embodiments as shown, cap 102 may be utilized, and one or more grooves 182 (each of which may be an annular groove) may be defined in an inner surface of the cap 102. Roller tube 104 may be translatable such that a different outer flange 180 may be in selective contact with each of the first rail 116 and second rail 118 in various positions along the axis 56. Further, in exemplary embodiments when the cap 102 is utilized, the roller tube 104 may be translatable such that each of the plurality of grooves 182 may selectively accommodate one or more of the plurality of outer flanges 180. Accordingly, in various different positions of the roller tube 104 along the axis 56, a different outer flange 180 may be in contact with each of the first rail 116 and second rail 118 and, if a cap 102 is utilized, a different outer flange 180 may be accommodated in each groove 182 or the groove 182 may be empty, depending on the position of the roller tube 104 along the axis 56.

In further exemplary embodiments, the roller tube 104 may be rotatably mounted on the support ramp 114, and rotatable about the axis 56 (e.g. relative to the support ramp 114). For example, roller tube 104 may be positioned in the inner channel 112 such that the roller tube 104 extends along the axis 56. Further, the roller tube 104 may be in contact with the support ramp 114. Rotation about the axis 56 may be relative to both the base 100 and the cap 102 (if utilized).

Referring again generally to FIGS. 1-15, in some embodiments, roller tube 104 may include a central portion 190, a first end portion 192, and a second end portion 194. The first and second end portions 192, 194 extend in opposite directions from the central portion 190, such as in opposite directions along the axis 56. In some embodiments, the outer flange(s) 180 may be disposed on the central portion 190. In some embodiments, the first and second end portions 192, 194 may each include one or more ribs 196, which may be annular ribs as shown.

Further, in some embodiments, clamp 54 may include one or more heat shrink tubes 200. Each heat shrink tube 200 may be connected to the roller tube 104. For example, in some embodiments as shown, a heat shrink tube 200 may be connected to and extend from the first end portion 192, and a heat shrink tube 200 may be connected to and extend from the second end portion 194. In some embodiments, ribs 196 may contact the heat shrink tube(s) 200 and assist in maintaining the location of the heat shrink tube(s) 200 by preventing the heat shrink tube(s) 200 from slipping from the roller tube 104 (such as the end portions 192, 194 thereof).

As discussed, cable assemblies 50 in accordance with the present disclosure include a cable 52 and one or more cable mounting clamps 54. The clamps 54 may be installable onto a cable 52 by a user, or may be factory pre-installed on the cable 52. In exemplary embodiments as shown, cable 52 is a fiber optic cable 52 which includes a plurality of optical fibers 70 disposed within an outermost exterior jacket 72. Mounting of a clamp 54 on a surface may, in exemplary embodiments, further mount the associated cable assembly 50 and cable 52 thereof, thus efficiently, securely and removably positioning the cable 52 on the surface.

When installed, a cable 52 may be inserted through a roller tube 104. Additionally, in some embodiments as shown, cable 52 may be inserted through the heat shrink tube(s) 200 that are connected to the roller tube 104, such that the heat shrink tube(s) 200 are also connected to the cable 52. In these embodiments, the heat shrink tube(s) 200 may be shrunk onto the cable 52 and roller tube 104. Because the roller tube 104 is disposed in the inner channel 112, the cable 52 may further extend through the inner channel 112, such as along the axis 56. Cable 52 may be generally fixed relative to the roller tube 104, such as in some embodiments due to contact by the heat shrink tube(s) 200 and/or epoxy or another suitable binder disposed between the cable 52 and roller tube 104, and thus may be generally not movable relative to the roller tube 104. However, advantageously, the cable 52 may be translatable with the roller tube 104 along the longitudinal axis 56 and, in some embodiments, rotatable with the roller tube 104 along the longitudinal axis 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable mounting clamp for mounting a cable to a surface, the cable mounting clamp comprising:

a base removably connectable to the surface, the base comprising an outer body which defines an inner channel and a support ramp disposed within the inner channel, the inner channel extending along a longitudinal axis, wherein the support ramp comprises a central ramp portion and opposing cantilevered wings each extending from the central ramp portion, and wherein the base comprises a tab removably insertable into an aperture defined in the surface, and wherein the base comprises a lock releasably connectable to the surface; and a roller tube disposed within the inner channel and moveably mounted on the support ramp, the roller tube translatable along the longitudinal axis relative to the support ramp.

2. The cable mounting clamp of claim 1, wherein the roller tube is further rotatable about the longitudinal axis.

3. The cable mounting clamp of claim 1, wherein the roller tube comprises a single outer flange, wherein the support ramp comprises a first rail and a second rail, and wherein the roller tube is translatable such that the single outer flange can selectively contact one of the first rail or the second rail.

4. The cable mounting clamp of claim 1, further comprising a cap connectable to the base to further define the inner channel therebetween.

5. The cable mounting clamp of claim 4, wherein a plurality of grooves are defined in an inner surface of the cap, wherein the roller tube comprises a plurality of outer flanges, and wherein the roller tube is translatable such that each of the plurality of grooves can selectively accommodate one of the plurality of outer flanges.

6. The cable mounting clamp of claim 1, wherein the cantilevered wings are each extending from the central ramp portion and opposing one another relative to the longitudinal axis.

7. The cable mounting clamp of claim 1, wherein the support ramp further comprises clips disposed on cantilevered ends of the cantilevered wings.

8. The cable mounting clamp of claim 1, wherein the cantilevered wings are resiliently biasable to selectively secure the roller tube within the support ramp.

9. The cable mounting clamp of claim 1, wherein the roller tube comprises a central portion, a first end portion, and a second end portion, and wherein the first and second end portions each comprise one or more outer ribs.

10. The cable mounting clamp of claim 1, further comprising a heat shrink tube connected to the roller tube.

11. The cable mounting clamp of claim 1, wherein the tab is a plurality of tabs.

12. The cable mounting clamp of claim 11, wherein the lock comprises a lever, the lever comprising a handle, a pivot point, and a contact face opposite the handle relative to the pivot point.

13. A cable assembly mountable to a surface, the cable assembly comprising:

a cable; and a cable mounting clamp, the cable mounting clamp comprising:

a base removably connectable to the surface, the base comprising an outer body which defines an inner channel and a support ramp disposed within the inner channel, the inner channel extending along a longitudinal axis, wherein the support ramp comprises a central ramp portion and opposing cantilevered wings each extending from the central ramp portion; and a roller tube disposed within the inner channel and moveably mounted on the support ramp, the roller tube translatable along the longitudinal axis relative to the support ramp, wherein the cable is inserted through the roller tube and extends through the inner channel, such that the cable is translatable with the roller tube along the longitudinal axis.

14. The cable assembly of claim 13, wherein the roller tube comprises a single outer flange, wherein the support ramp comprises a first rail and a second rail, and wherein the roller tube is translatable such that the single outer flange can selectively contact one of the first rail or the second rail.

15. The cable assembly of claim 13, further comprising a cap connectable to the base to further define the inner channel therebetween.

16. The cable assembly of claim 15, wherein a plurality of grooves are defined in an inner surface of the cap, wherein the roller tube comprises a plurality of outer flanges, and wherein the roller tube is translatable such that each of the plurality of grooves can selectively accommodate one of the plurality of outer flanges.

17. The cable assembly of claim 13, wherein the cantilevered wings are each extending from the central ramp portion and opposing one another relative to the longitudinal axis.

18. The cable assembly of claim 13, wherein the support ramp further comprises clips disposed on cantilevered ends of the cantilevered wings.

19. The cable assembly of claim 13, wherein the cantilevered wings are resiliently biasable to selectively secure the roller tube within the support ramp.

* * * * *